United States Patent [19]

Wagner et al.

[11] 3,773,624
[45] Nov. 20, 1973

[54] PROCESS FOR THE ENRICHMENT OF L-ASPARAGINASE

[75] Inventors: Otto Wagner; Klaus Bauer; Wilfried Kaufmann; Erich Rauenbusch; Alfred Arens; Eckart Irion, all of Wuppertal-Elberfeld, Germany

[73] Assignee: Bayer Aktiengesellschaft, Leverkusen, Germany

[22] Filed: Dec. 26, 1968

[21] Appl. No.: 786,901

[30] Foreign Application Priority Data

Dec. 27, 1967 Germany.................. P 16 42 615.6
Apr. 6, 1968 Germany.................. P 17 67 158.8
Apr. 6, 1968 Germany.................. P 17 67 157.7

[52] U.S. Cl. ............................... 195/66 A, 195/62
[51] Int. Cl. .............................................. C07g 7/02
[58] Field of Search........................... 195/66 A, 62

[56] References Cited
OTHER PUBLICATIONS

Campbell et al., Biochemistry Vol. 6, No. 3, pp. 721–730, March 1967.

Dixon et al., Enzymes 2nd Edition 1964, pp. 44–46.

Primary Examiner—Lionel M. Shapiro
Attorney—McCarthy, Depaoli, O'Brien and Price

[57] ABSTRACT

Crude aqueous solutions of L-asparaginase are purified by fractional precipitation after addition thereto of an aqueous solution of a polyalkylene glycol such as polyethylene glycol, preferably of 40 to 60 weight percent and of a molecular weight between 1,000 and 5,000, and separation of the precipitate by centrifuging. The residual solution is further precipitated and the method repeated to obtain fractions of high yield which are combined and the process repeated. In another modification, substantial improvement in the selectivity of the precipitation with polyethylene glycol is further obtained by addition of an amide, such as urea, to the L-asparaginase prior to the precipitation and purification is further increased by subjecting the thus prepurified enzyme to a precipitation at its isoelectric point, with addition of polyethylene glycol and the precipitate washed with acetone. Crystalline L-asparaginase is produced.

12 Claims, 3 Drawing Figures

FIG. I
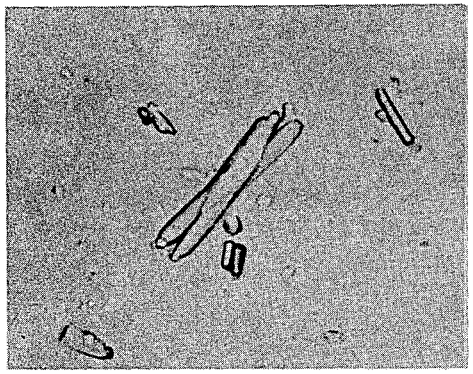
Enlarged: about 700 times
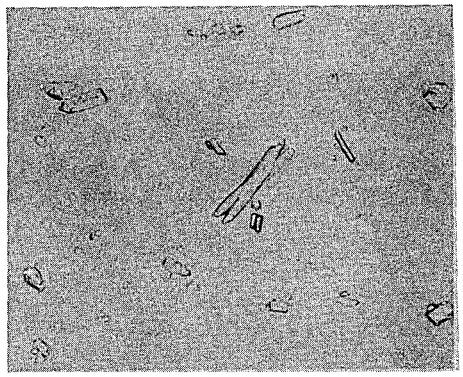
Enlarged: about 350 times
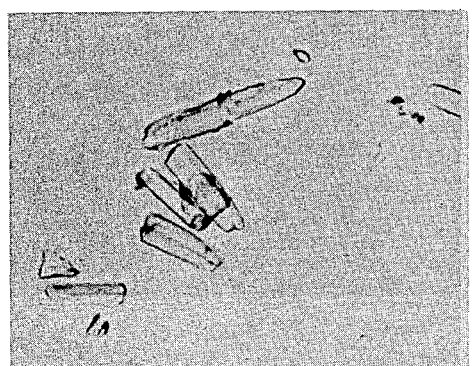
Enlarged: about 700 times
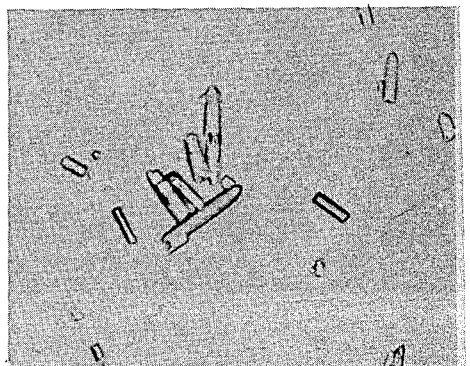
Enlarged: about 400 times
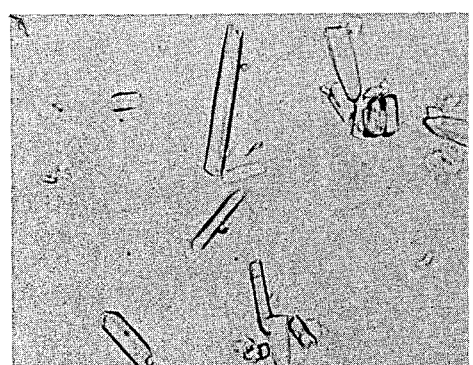
Enlarged: about 600 times
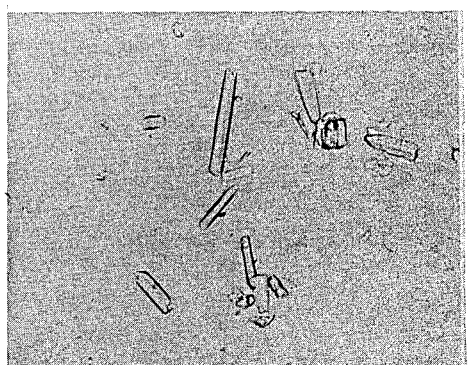
Enlarged: about 400 times

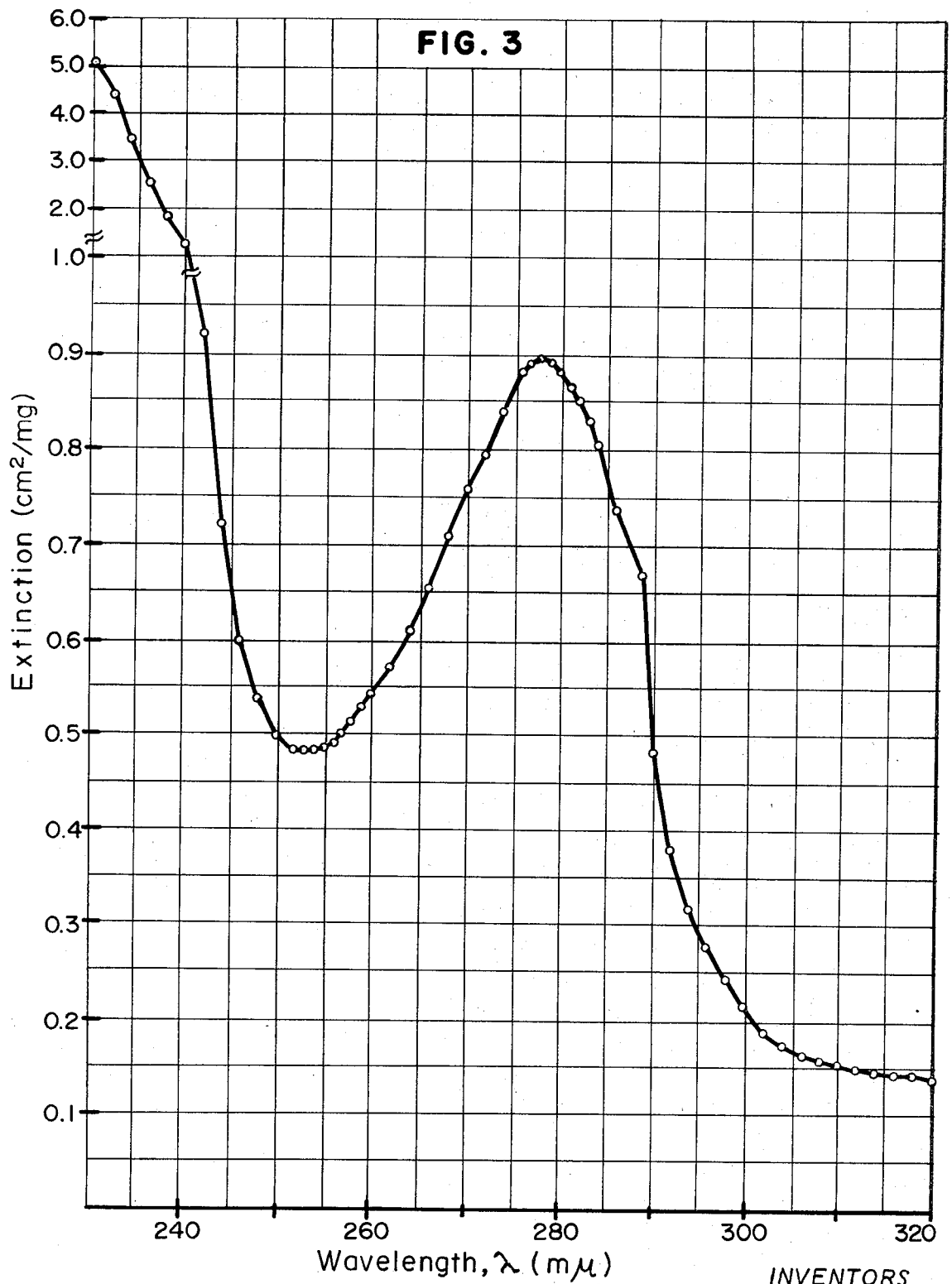

PROCESS FOR THE ENRICHMENT OF L-ASPARAGINASE

SUMMARY OF THE INVENTION

1. Field of the Invention

The present invention is, in general, directed to a process for the enrichment of L-asparaginase and particularly to a method suitable for application of an industrial scale as well as leading to products of a degree of purity acceptable for clinical use.

2. Description of the Prior Art

L-asparaginase is a known enzyme capable of splitting the amide bond in L-asparagine hydrolytically and is of importance medically for combatting malignant tumors which require L-asparagine for their growth. It is being used clinically at an increasing rate without there having been any possibility hitherto of supplying the quantities required therefor [Proc. N. A. S. 56, 1516-19 (1966)].

In accordance with the prior methods, the enzyme was extracted from animal or plant materials and enriched by customary procedures employed in enzyme chemistry. One such prior art method involved the production of L-asparaginase from Escherichia coli (E. coli) cells from which the enzyme was liberated through ultrasonic treatment, the crude solution partially saturated with ammonium sulfate, thereby salting out the enzyme, which was further enriched through columnar chromatography customary in enzyme chemistry. (Biochemistry, 6, 721 (1957))

SUMMARY OF THE INVENTION

A convenient method for assaying the activity of the enzyme, L-asparaginase, produced in accordance with the methods and processes of the invention is one wherein amidases, such as L-asparaginase, converts the acid amide asparagin, into the corresponding acid, aspartic acid, and ammonia; the reaction involving the hydrolytic cleavage of the amide bond in L-asparagin with liberation of ammonia, the amount of which can be determined colorimetrically with Nessler's reagent as more fully described in Cancer Research 26, 2213-2217, October, 1966.

Since the L-asparaginase unit of enzymatic activity has not, hitherto, been defined in complete agreement in the art it is defined and assayed herein as follows:

One unit (30-minute unit) of activity of L-asparaginase is equal that quantity of enzyme which will liberate 1 $\mu$. mole of ammonia from L-asparagin in 30 minutes at 37°C and at a pH of 7.2. Insofar as can be seen from the literature, hitherto L-asparaginase preparations have been described which contain, as a maximum, about 1,000 units per mg [Biochemistry 6, 721 (1967)].

It has now been found that L-asparaginase can be purified by treating a crude aqueous solution thereof with an aqueous solution of a polyalkylene glycol, forming a precipitate and thereafter decomposing the precipitate in accordance with conventional techniques.

Polyalkylene glycols which are employed in the novel process of this invention have an optimum molecular weight of between about 1,000 and about 5,000 — lower and higher molecular weight products, although useful, are less suitable. A particularly preferred polyalkylene glycol is polyethylene glycol and products of this type are sold commercially as Carbowax. Other polyalkylene glycols such as polypropylene glycols, polybutylene glycol, etc., are operable in the novel process of this invention, but are less preferred than the polyethylene glycols. For convenience, the novel process of this invention will be described with reference to polyethylene glycol, although it is to be understood that any polyalkylene glycol will also function.

In accordance with this invention, a crude aqueous enzyme solution of L-asparaginase containing from about 1 to 30 weight percent, preferably from 1 to 10 weight percent of said enzyme is contacted with a 40 to 60 weight percent aqueous solution of polyethylene glycol. The aqueous solution of polyethylene glycol is preferably added in stages such that the final concentration of ethylene glycol in the solution is from 15 to 40 weight percent and more preferably from 18 to 30 weight percent.

A precipitate is formed which is centrifuged away, further polyethylene glycol solution is added to the remaining clear solution to form more precipitate which is again centrifuged, and this process is repeated as often as desired. The precipitations obtained in this fractionation procedure contain overwhelming biologically active L-asparaginase, besides small quantities of inherent proteins. The precipitates can be cleared of adhering polyethylene glycol by dissolving them in water whereupon the solution is freed by insoluble components and is then precipitated with an excess of acetone. At the same time, L-asparaginase is flocculated out while polyethylene glycol remains in solution. In place of acetone, it is possible to precipitate with other solvents such as, for example, with secondary alcohols. On the other hand, one extraction of the polyethylene glycol from the solution of the precipitate can be accomplished with such solvents which do not denature the enzyme for example, with diisopropyl ether. Furthermore, it is also possible to remove the polyethylene glycol through dialysis and to obtain the L-asparaginase through freeze-drying of the nondialyzable portions. It is also possible to dry the precipitate and then extract it with acetone or other solvents.

Effectively this entire operation is carried out at a temperature which may be between 0° and 40°C. The precipitation of the enzyme from the aqueous solutions is independent of the pH value. Effectively one can operate in a pH range of between about 4 and 10.

DESCRIPTION OF THE PREFERRED EMBODIMENTS

Figure 2:
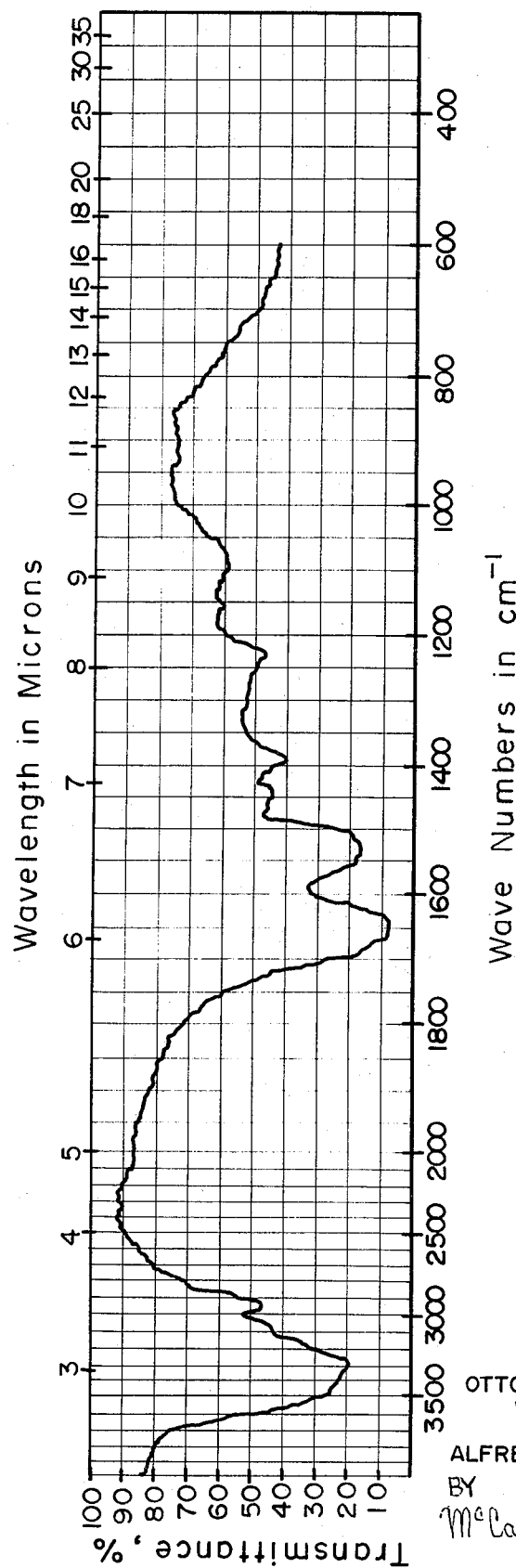

The advantages of the present process as compared with the prior known methods, such as by precipitation with ammonium sulfate, for enrichment of L-asparaginase are apparent in the following aspects:

1. Practically any desired quantities of crude asparaginase may be used without deterioration of the yields.
2. The operations are carried out in highly concentrated aqueous solutions, whereby the enzyme can be obtained easily through precipitation with solvents or through freeze-drying in enriched form.
3. Excess polyethylene glycol can easily be removed with solvents.

In another embodiment of this invention, it has been further found that the selectivity of the polyethylene glycol precipitation above-described can be substantially improved if urea or other amides that split hydrocarbon bridge bonds are added to the L-asparaginase solution prior to treatment with the aqueous solutions of polyethylene glycol.

This operation is advantageously carried out at a temperature that can range between −4° and 40°C and at a pH range of about 4 to 10.

The urea remaining in the precipitated L-asparaginase can be removed by adding water and subsequent renewed polyethylene glycol precipitation.

Instead of urea, other amides that dissolve hydrogen bridge bonds can be used, for example, guanidine, formamide, acetamide and other water soluble amides. The deaggregating effect of urea and other amides on proteins has been reported in many places (see, for example, J. Biol. Chem. 123 (1938), page 543).

The advantages resulting on addition of urea or other amide to the L-asparaginase solution prior to the polyethylene glycol precipitation are apparent in that in two precipitation steps a degree of purity of the L-asparaginase is attained which was formerly not possible on a technical scale. Additionally, through the solubilizing characteristics of, for example, urea, it is possible to work with more highly concentrated aqueous solutions of L-asparaginase, whereby the technical process gains considerably in simplicity. Another benefit is that the results of a polyethylene glycol precipitation become better reproducible in the presence of, for example, urea, in spite of varying quality of the crude asparaginase.

In another modification of this invention, it has been found that the purity of the L-asparaginase can be substantially increased by subjecting the enzyme which has been prepurified by means of the polyethylene glycol precipitation above-described to an activity of 3,000 to 4,500 units/mg, to an additional precipitation at the isoelectric point of the enzyme.

At its isoelectric point of about 4.9 pH the enzyme has a lower solubility than all other proteins still present in the solution. This leads to precipitation of the L-asparaginase, which can be assisted by the addition of small amounts of polyethylene glycol or of water miscible organic solvents. This operation can be effectively carried out by adjusting the pH value to about 4.9 to 5.5 and undertaking the precipitation at low temperatures.

The advantages of this modification as compared with the precipitation with the polyethylene glycol above or as modified by addition of an amide resides in that a product is obtained which has a greater degree of purity. The preparation produced according to the invention can be used as therapeutic agent for the known indications for L-asparaginase.

The crude L-asparaginase used in the following examples as a starting material is obtained as follows:

10 weight percent corn steeping water solution is adjusted with 2N potash lye to pH 7.0, heated for 20 minutes to 120°C, and after cooling is clarified in an overflow centrifuge. Thirty liters of this clear corn steeping water solution are diluted with 170 liters of tap water. 1.20 kg of sodium lactate and 400 grams of ammonium sulfate are then added and dissolved after which the nutrient solution obtained is sterilized at 110°C for 40 minutes in a fermentative. After cooling, the solution is then inoculated with 500 cm of a shaken culture of *Escherichia coli* ATCC 9637 in a nutrient broth which had been grown for 18 hours at 30°C. The fermentation addition is aired at 30°C with 80 liters of air/min. at 150 revolutions of the agitator per minute. After a growth time of 17 hours, the bacteria which contain L-asparaginase are separated in the overflow centrifuge and are resuspended in 20 liters of distilled water. Eighty liters of acetone are permitted to run into this suspension while stirring, the bacteria which have been flocculated out are separated in the overflow centrifuge, and the mass of cells is again resuspended in 20 liters of distilled water. For the extraction of the L-asparaginase from the cells of the bacteria, the suspension is stirred for 4½ hours at 30°C. During this time, the pH is kept at 7.5 – 7.8 through additions of 1N sodium hydroxide. Through separation of the extracted bacterial cells in the overflow centrifuge, 17 liters of clear solution are obtained from which the L-asparaginase, in addition to other substances contained in the cell, is precipitated out through the addition of 68 liters of acetone. The precipitation which has developed is isolated, subsequently washed with acetone, and dried in the vacuum at 25° to 30°C. The crude L-asparaginase obtained in such a manner has an enzymatic activity of approximately 100 units (30-minute units) per mg.

The starting material obtained in such a manner can, if desired, be prepurified as follows:

Fifty grams of the above crude asparaginase having an activity of 100 units/mg are dissolved in 1,000 ml of 1/15 M Tris chloride buffer of pH 8.5 while stirring at room temperature. The solution is heated in 100 ml portions in the water bath for 15 minutes to 59.5°C, whereby a strong flocculation of inactive proteins occurs, while the enzyme remains unchanged in solution. The united denaturization deposits are cooled off and are centrifuged at 6,000 rpm until clear. The solution has a specific activity of 200 to 300 units/mg of protein. Here it is designated as solution A. Solution A can be fractionated in accordance with the known fractionization of enzymes with solvents [Biochem. J. 48, 42–48 (1951)] with acetone, whereby the L-asparaginase is contained in the precipitate which forms whenever the solution is adjusted from 30 to 50 percent acetone. In this manner, one will achieve preparations with approximately 500 units/mg.

In the process according to the invention, one can start either from a crude asparaginase with approximately 100 units/mg or from an enriched preparation. The solution A, or the L-asparaginase accessible from that through acetone fractionation, has proven itself to be particularly effective as the starting material for the fractionation with polyethylene glycol.

EXAMPLE 1

1,000 ml of solution A (obtained from 50 grams of crude L-asparaginase with an activity of 112 units/mg) were cooled to 3°C and were treated with 500 ml of 50 weight percent aqueous polyethylene glycol solution. L-asparaginase precipitated from the solution and was recovered through centrifuging. The L-asparaginase obtained was given the designation "Fraction 1." From the residual solution of Fraction 1 (1,468 ml) further material was precipitated and worked up with 100 ml of 50 percent polyethylene glycol solution. This precipitate was identified as Fraction 2. The excess solution of Fraction 2 (1,550 ml) was again treated and worked up with 100 ml of polyethylene glycol solution and the precipitate identified as Fraction 3. In an analogous manner, Fraction 4 was obtained. The degree of purity achieved in the case of these fractionations and the yields are shown in the following table:

| Fraction Number | Yield in grams | Units/mg. | Percent Units Related to the Crude Asparaginase Used |
|---|---|---|---|
| 1 | 1.46 | 230 | 6 |
| 2 | 2.43 | 1,050 | 43 |
| 3 | 1.40 | 1,240 | 29 |
| 4 | 0.64 | 310 | 4 |

EXAMPLE 2

100 grams of crude asparaginase with 103 units/mg were dissolved in 2 liters of water and were clarified through centrifuging. The solution was adjusted to pH 8.5 with 1N KOH and was fractionated with polyethylene glycol in a manner analagous to Example 1. Fractions 2 and 3, obtained in this manner, were mixed together to yield 12.0 grams of product of the following purity:

Units/mg — 765

Yield related to units used — 88 percent of theory

Fractions 2 and 3, obtained in Example 2 which had been mixed together, were dissolved in 400 ml of water and were again subjected to a fractionation with polyethylene glycol solution. The sediments of Fractions 2 and 3, obtained in such a manner, were dispersed in dry, intensely cooled acetone, centrifuged, dissolved in water, filtered with a Seitz K-3 Layer and were then lyophilized.

Yield — 4.40 grams

Units/mg. — 1,730

Yield related to 100 g. crude asparaginase — 74 percent

EXAMPLE 4

5.0 grams of L-asparaginase with 576 units/mg, prepurified with acetone through fractionation from solution A, were dissolved in 100 ml of water and were fractionated with polyethylene glycol solution as described in Example 1. The degree of purity achieved in the case of this fractionation and the yields can be gathered from the following table:

| Fraction Number | Yield in Grams | Units/mg. | Percent Units Related to the Crude Asparaginase Used |
|---|---|---|---|
| 1 | 1,381 | 730 | 38 |
| 2 | 0,362 | 1,930 | 24 |
| 3 | 0,155 | 640 | 3 |
| 4 | 1,000 | 180 | 6 |

The following examples are illustrative of the procedure including the addition of an amide such as urea, in the L-asparaginase solution prior to precipitation with polyethylene glycol.

EXAMPLE 5

5 kg crude asparaginase are fed into 40 liters of distilled water. The pH value of the solution which is slowly forming is adjusted with 1.5 liters 1N NaOH to 8.5 – 8.9.

Thereupon urea is added to a concentration of about 3 mol/liter. The temperature of the solution will thereby drop to about 10°C. It is stirred for another hour and the resulting solution is stored at 4°C for 16 to 24 hours. After this time fraction 1 is precipitated by the addition of 25 to 30 liters of a 50 percent polyethylene glycol solution. Fraction 1 is rejected. Fraction 2 is precipitated by the addition of 15 more liters of 50 percent polyethylene glycol solution. Fraction 2 contains the main activity. By the addition of further 15 liters of the polyethylene glycol solution to the residue from Fraction 2, Fraction 3 is extracted, which contains about 20 to 25 percent of the estimated asparaginase activity.

Fraction 2 is taken up in about 2.5 liters distilled water. By the addition of 250 ml of a 50 percent polyethylene glycol solution Fraction 1a is precipitated: by further addition of 250 ml polyethylene glycol solution, Fraction 2a is precipitated. In the same way, Fractions 3a and 4a are extracted. The degrees of purity and yields obtained by this fractioning appear from the following table:

| Fraction Number | Yield in Grams | Units/mg | Percent of the Enzymatic Activity to Asparaginase (Crude) introduced |
|---|---|---|---|
| 1a | 1.6 | 582 | 0.3 |
| 2a | 8.1 | 3000 | 8.0 |
| 3a | 23.0 | 4320 | 31.2 |
| 4a | 16.2 | 2220 | 11.5 |
| 5a | 18.9 | 750 | 4.6 |
| | | Total | 55.6 |

EXAMPLE 6

The process of Example 5 was repeated with the exception that the concentration of urea was raised to about 6 mol/liter. The subsequent standing time for the solution is only 2 hours. The yields are generally in agreement with those of Example 5.

EXAMPLE 7

The process of Example 5 was repeated but guanidine hydrochloride instead of urea is added to a concentration of 2 mol/liter. The standing time for the solution is 2 hours. The yields correspond to those of Example 5.

The following examples are illustrative of the abovedescribed procedure of precipitating at its isoelectric point, an L-asparaginase which has been prepurified by means of polyethylene glycol precipitation.

EXAMPLE 8

100 grams L-asparaginase with a specific activity of about 100 units/mg protein purified by polyethylene glycol precipitation are dissolved in 1,000 cc distilled water at room temperature. During the process of solution, the pH value is adjusted with 1N NaOH to 8.5 to 8.9. The insoluble matter then remaining is centrifuged off for 10 minutes at 6,000 rpm. The pH value of the clear remainder is slowly brought to pH 7 to 6.8 in an ice bath. An oily sediment separating out then is centrifuged off for 25 minutes at 6,000 rpm. The clear remainder from this centrifuging is adjusted to pH 5.3 with 1N HCl. Thereupon a 50 percent polyethylene glycol solution is added in 25 ml installments and each time centrifuged off at 6,000 rpm for 10 minutes. In this way about 5 to 6 fractions are obtained, whereby the main activity with the highest specific activity is found in fractions 3 to 5.

Yield: 60 to 70 percent

EXAMPLE 9

The procedure of Example 8 is repeated, but instead of polyethylene glycol, cold acetone is added in four steps up to 20 percent of the volume of the solution. The yields are similar to those of Example 8.

EXAMPLE 10

The procedure of Example 8 is repeated, but instead of polyethylene glycol, ethylene glycol is added in five steps up to 20 percent of the volume of the solution. The yields are similar to those of Example 8.

EXAMPLE 11

100 grams of polyethylene glycol purified L-asparaginase with a specific activity of 4,200 units/mg. protein are dissolved in 500 ml water. The pH value of the solution is adjusted with 1N NaOH to 8.5. Undissolved substances are centrifuged off for 15 minutes at 6,000 rpm. The pH value of the clear solution is adjusted at 4°C with 1N HCl to pH 6.8 and the precipitate appearing thereby is centrifuged off. The clear residue after centrifuging is slowly adjusted with 1N NCl to pH 5 to 5.1 and left for several hours at 4°C. The precipitate appearing thereafter is centrifuged off. It contains the L-asparaginase with a yield of 60 to 80 percent of the introduced activity and with a maximum specific activity up to 5,700 units/mg. protein.

The following example is illustrative of the procedure wherein the enrichment steps are combined to produce pure crystalline L-asparaginase.

EXAMPLE 12

200 grams of crude asparaginase with an activity of 97 units/mg. are dissolved in 4,000 ml of glycine buffer, pH 8.5 (Biochemisches Taschenbuch, page 91, 1964) and are heated by portions for 30 minutes to 60°C. At the same time inactive protein is flocculated out, while the enzyme remains unchanged in solution. The sediment is centrifuged at 6,000 rpm until clear and is fractionated with acetone. The portion precipitated upon addition of 40–45 percent acetone amounts to 16.4 grams. It contains 863 units/mg.

9.3 grams of this enriched L-asparaginase are dissolved in 190 ml of 3 molar urea solution, are adjusted to pH 8.5 with sodium lye, and are fractionated with polyethylene glycol (50 percent aqueous solution). The fraction obtained after the addition of 22 to 30 ml is treated as usual. Yield: 2.1 grams; Units/mg: 3130.

A solution of 4.0 grams of this sample is adjusted in 40 ml of bidistilled water with 1N hydrochloric acid to pH 5.2 and is fractionated with polyethylene glycol solution. The portion deposited after the addition of 12.5 – 15 ml is centrifuged after standing for 20 minutes at room temperature, and after standing for 2 hours in acetone, it is washed with additional acetone. Yield: 1.2 grams; Units/mg.: 6,110.

Flat prisms. Brown coloration at 225°C, sintering from 260°C, foaming from 270°C, and complete decomposition from 274°C.

The crystals obtained in this manner are recrystallized from aqueous solutions through addition of organic solvents, such as acetone or alcohol, or through addition of polyethylene glycol.

The crystals show the following results of analysis:
Water content:
12.5 percent
(The determination of H₂O contents was made by drying for 6 hours in the high vacuum at 110°C in a special drying pistol according to J. Unterzaucher [Mikrochem. 18, 315 (1935)]. Constancy of weight was tested by continuous drying.)
Residue of ignition:
0.11 percent
(The determination of the ash content or proteins was made according to F. Pregl and H. Roth [Quantitative Organic Microanalysis, p. 174, Springer, Vienna (1949)]).
Protein contents:
88.0 percent
(The determination of protein was made according to the precipitation of trichloroacetic acid in accordance with the BIURET method T. E. Weiselbaum, [Am. J. Clin. Path. (Tech. Sec.), 10, 40 (1946)]).
Total volume: 4 ml (of this 2 ml Biuret reagent):
$E^{1cm}_{546 m\mu}$ · 12.3 = mg protein/ml test solution
The sedimentation constant showed a value of $S^{1\%}_{20}$ ° = 4.33.

Photomicrographs of the crystalline L-asparaginase at various degrees of enlargement, and infra-red and ultra-violet spectra are presented in the accompanying drawings, FIGS. 1, 2 and 3, respectively.

The L-asparaginase crystals were also identified with respect to their infra-red (IR) and ultra-violet (UV) spectra as illustrated at FIGS. 2 and 3, respectively.

The infra-red spectrum measuring instrument was a Bruckl instrument and the spectrum run under the following conditions:
Grating groves/mm: — 75/mm
Source intensity: — 3
Gain: — 2.5
Suppression: — 5
Scanning Speed: — 100 cm⁻¹/minute The ultra-violet light measuring instrument was a Zeiss Spectral Photometer PMQ II and run under the following conditions:
Model Number: PMQ II
° Quartz prism: +
Hydrogen light source type: Zeiss type H 30 DS
Concentration: 1 mg/ml
Layer Thickness: 1 cm
Stray Light: < 0.1 percent
Light Path: 1 cm

What is claimed is:

1. A process for the purification of an aqueous solution of crude L-asparaginase which comprises precipitating the L-asparaginase from said aqueous solution by the addition thereto of an aqueous solution of a polyalkylene glycol.

2. The process of claim 1 wherein the polyethylene glycol solution formed is centrifuged, further polyethylene glycol solution added to the clear remaining solution, and the process repeated to obtain the desired degree of purification.

3. The process for the purification of crude L-asparaginase which comprises adding an amide to aqueous solution thereof and thereafter precipitating L-asparaginase by addition thereto of an aqueous solution of polyalkylene glycol.

4. The process of claim 3 wherein the polyalkylene glycol is polyethylene glycol.

5. The process for the purification of crude L-asparaginase which comprises adding urea to an aqueous solution thereof, fractionally precipitating the L-asparaginase by addition of an aqueous solution of polyalkylene glycol, redissolving the precipitated L-asparaginase in water to form an aqueous solution, adjusting the pH of the enriched enzyme to its iso-electric point and further fractionating the solution with polyethylene glycol and precipitating and washing the enzyme in acetone.

6. A process for the purification of L-asparaginase from an aqueous solution comprising precipitating the L-asparaginase from said aqueous solution by the addition thereto of a polyalkylene glycol.

7. The process of claim 5 wherein the fractionation of the enriched enzyme solution with polyethylene glycol is carried out at a pH of about 4.9 to 5.5.

8. A process for the purification of L-asparaginase from an aqueous solution comprising precipitating the L-asparaginase from said aqueous solution by the addition thereto of a polyethylene glycol.

9. A process for the purification of L-asparaginase from an aqueous solution comprising precipitating the L-asparaginase from said aqueous solution by the addition thereto of a polypropylene glycol.

10. A process for the purification of L-asparaginase from an aqueous solution comprising precipitating the L-asparaginase from said aqueous solution by the addition thereto of a polyalkylene glycol at temperatures between 0°C. and ambient temperature at a pH in the range between about 4 and 10.

11. A process for the purification of L-asparaginase from an aqueous solution comprising precipitating the L-asparaginase from said aqueous solution by the addition thereto of a polyethylene glycol at temperatures between 0°C. and ambient temperature at a pH in the range between about 4 and 10.

12. A process for the purification of L-asparaginase from an aqueous solution comprising precipitating the L-asparaginase from said aqueous solution by the addition thereto of a polypropylene glycol at temperatures between 0°C. and ambient temperature at a pH in the range between about 4 and 10.

* * * * *